US012663785B2

(12) United States Patent
Renfro et al.

(10) Patent No.: US 12,663,785 B2
(45) Date of Patent: Jun. 23, 2026

(54) APPARATUSES, COMPUTER-IMPLEMENTED METHODS, AND COMPUTER PROGRAM PRODUCTS FOR CLOSED LOOP OPTIMAL PLANNING AND SCHEDULING UNDER UNCERTAINTY

(71) Applicant: Honeywell International Inc., Charlotte, NC (US)

(72) Inventors: Jeffrey Glen Renfro, Deer Park, TX (US); Saadet Ulas Acikgoz, Northbrook, IL (US)

(73) Assignee: Honeywell International Inc., Charlotte, NC (US)

( * ) Notice: Subject to any disclaimer, the term of this patent is extended or adjusted under 35 U.S.C. 154(b) by 513 days.

(21) Appl. No.: 18/182,767

(22) Filed: Mar. 13, 2023

(65) Prior Publication Data

US 2024/0201670 A1 Jun. 20, 2024

Related U.S. Application Data

(60) Provisional application No. 63/476,307, filed on Dec. 20, 2022.

(51) Int. Cl.
*G05B 19/418* (2006.01)

(52) U.S. Cl.
CPC ................. *G05B 19/41865* (2013.01); *G05B 2219/32423* (2013.01); *G05B 2219/34418* (2013.01); *G05B 2219/49068* (2013.01)

(58) Field of Classification Search
CPC ............ G05B 19/418; G05B 19/41865; G05B 2219/32015; G05B 2219/32423; G05B 2219/34418; G05B 2219/49068
See application file for complete search history.

(56) References Cited

U.S. PATENT DOCUMENTS

| | | |
|---|---|---|
| 5,351,184 A | 9/1994 | Lu et al. |
| 5,682,309 A | 10/1997 | Bartusiak et al. |

(Continued)

FOREIGN PATENT DOCUMENTS

| | | |
|---|---|---|
| EP | 2172887 A2 | 4/2010 |
| WO | 2015/184123 A1 | 12/2015 |
| WO | 2022/248855 A1 | 12/2022 |

OTHER PUBLICATIONS

Non-Final Rejection Mailed on Jun. 3, 2025 for U.S. Appl. No. 18/322,912, 20 page(s).

(Continued)

*Primary Examiner* — Vincent H Tran
(74) *Attorney, Agent, or Firm* — Alston & Bird LLP

(57) ABSTRACT

Embodiments of the present disclosure provide for improved optimized plan predictions. Such embodiments, utilize optimized model(s) that accounts for uncertainty in input data to the model. Some example embodiments, receive input data associated with one or more industrial plants. At least a portion of the input data may include uncertain input data. The noted example embodiments, generate uncertainty-based modification data, and apply the uncertainty-based modification data to the input data to generate updated input data. The noted example embodiments generate, based at least in part on applying the updated input data to an optimization model, predicted optimized plan. The predicted optimized plan comprises optimized plan data. Further, the noted example embodiments initiate the performance of one or more prediction-based actions based at least in part on the predicted optimized plan.

17 Claims, 6 Drawing Sheets

(56) References Cited

U.S. PATENT DOCUMENTS

| | | | | |
|---|---|---|---|---|
| 11,698,625 | B2 * | 7/2023 | Berntorp | G05B 19/4155 |
| | | | | 700/49 |
| 2007/0088447 | A1 * | 4/2007 | Stothert | G05B 13/04 |
| | | | | 700/36 |
| 2009/0319059 | A1 | 12/2009 | Renfro et al. | |
| 2012/0166616 | A1 | 6/2012 | Meehan et al. | |
| 2015/0032681 | A1 * | 1/2015 | Mevissen | G06N 5/04 |
| | | | | 706/52 |
| 2017/0284198 | A1 * | 10/2017 | Pop | E21B 49/10 |
| 2018/0299878 | A1 | 10/2018 | Cella et al. | |
| 2019/0130330 | A1 | 5/2019 | Slagle et al. | |
| 2019/0155268 | A1 | 5/2019 | Cohen et al. | |
| 2020/0089229 | A1 * | 3/2020 | Lee | B60W 60/001 |
| 2020/0162559 | A1 * | 5/2020 | Sustaeta | G06Q 10/06 |
| 2021/0358058 | A1 | 11/2021 | Da Mata Cecilio et al. | |
| 2021/0373513 | A1 * | 12/2021 | Quirynen | G06F 17/13 |
| 2022/0027817 | A1 | 1/2022 | Hubbs et al. | |
| 2022/0327538 | A1 | 10/2022 | Kumar et al. | |
| 2023/0022510 | A1 * | 1/2023 | Quirynen | G05B 13/048 |
| 2024/0295863 | A1 | 9/2024 | O'Nien et al. | |

OTHER PUBLICATIONS

Non-Final Rejection Mailed on May 15, 2025 for U.S. Appl. No. 18/175,233, 21 page(s).

Andreas Dellnitz et al., "Energy costs vs. carbon dioxide emissions in short-term production planning," Journal of Business Economics, 90:1383-1407, (Jul. 14, 2020).

Chaoyang Zhang et al., "Big Data Analysis Approach for Real-Time Carbon Efficiency Evaluation of Discrete Manufacturing Workshops," IEEE Access, 7:107730-107743, (2019).

Extended European Search Report Mailed on Apr. 29, 2024 for EP Application No. 23213920, 13 page(s).

Extended European Search Report Mailed on May 14, 2024 for EP Application No. 23212294, 7 page(s).

Extended European Search Report Mailed on May 14, 2024 for EP Application No. 23212316, 9 page(s).

Extended European Search Report Mailed on May 21, 2024 for EP Application No. 23213234, 10 page(s).

Lin Kong et al., "Multi-layer integration framework for low carbon design based on design features," Journal of Manufacturing Systems, 61:223-238, (Sep. 21, 2021).

Zhongtai Hu et al., "A digital twin-based framework of manufacturing workshop for marine diesel engine," The International Journal of Advanced Manufacturing Technology, 117:3323-3342, (Aug. 27, 2021).

Non-Final Rejection Mailed on Jun. 23, 2025 for U.S. Appl. No. 18/187,873, 6 page(s).

Amanda Copperthite et al., U.S. Appl. No. 18/175,233 for "Method and Apparatus for Optimizing Carbon Emissions Associated With an Operation of a Processing Plant", filed Feb. 27, 2023.

Amanda Copperthite et al., U.S. Appl. No. 18/187,873 for "Methods, Apparatuses, and Computer Programming Products Implementing a Multi-Variable, Closed Loop Approach for Determining an Optimization Pathway", filed Mar. 22, 2023.

Amanda Copperthite et al., U.S. Appl. No. 18/322,912 for "Emission Optimization for Industrial Processes", filed May 24, 2023.

Hauke Engel et al., "Failure is not an option: Increasing the chances of achieving net zero," Mckinsey & Company, 7 pages, (Jun. 2022).

J. G. Renfro et al., "Simultaneous Optimization and Solution of Systems Described by Differential/Algebraic Equations," Computers and Chemical Engineering, 11(5):503-517, (1987).

Jasmeer Ramlal et al., "Moving Horizon Estimation for an Industrial Gas Phase Polymerization Reactor," Proceedings of American Control Conference (ACC), 6 pages, (2007).

Jean-Mark Ollagnier et al., "Reaching Net Zero by 2050," Accenture, 26 pages, (2021).

Jeffrey D. Kelly et al., "Continuously Improve the Performance of Planning and Scheduling Models with Parameter Feedback," Foundations of Computer Aided Operations Conference, 5 pages, (2008).

Matthew Ellis et al., "A tutorial review of economic model predictive control methods," Journal of Process Control, 24:1156-1178, (2014).

Michael J. Risbeck et al., "Mixed-Integer Model Predictive Control with Applications to Building Energy Systems," Ph.D. Thesis, University of Wisconsin—Madison, 204 pages, (2018).

Robert E. Young et al., "Evolution of an Industrial Nonlinear Model Predictive Controller," Chemical Process Control-VI, AlChE Symposium Series No. 326, vol. 98, 342-351, (2001).

RTI, "Net Zero Planner—An Integrated Modeling Tool," 5 pages, (2023). [Retrieved from the Internet Sep. 13, 2023: URL: <https://www.rti.org/impact/net-zero-planner-integrated-modeling-tool>].

Urmila Diwekar, "Introduction to Applied Optimization," Second Edition, Springer, 310 pages, (2008).

Advisory Action (PTOL-303) Mailed on Dec. 10, 2025 for U.S. Appl. No. 18/322,912, 3 page(s).

Advisory Action (PTOL-303) Mailed on Nov. 7, 2025 for U.S. Appl. No. 18/175,233, 3 page(s).

Final Rejection Mailed on Oct. 3, 2025 for U.S. Appl. No. 18/322,912, 21 page(s).

Notice of Allowance and Fees Due (PTOL-85) Mailed on Oct. 15, 2025 for U.S. Appl. No. 18/187,873, 7 page(s).

Final Rejection Mailed on Sep. 11, 2025 for U.S. Appl. No. 18/175,233, 23 page(s).

EP Office Action Mailed on Oct. 16, 2025 for EP Application No. 23213920, 8 page(s).

Non-Final Rejection Mailed on Feb. 19, 2026 for U.S. Appl. No. 18/175,233, 27 page(s).

* cited by examiner

APPARATUSES, COMPUTER-IMPLEMENTED METHODS, AND COMPUTER PROGRAM PRODUCTS FOR CLOSED LOOP OPTIMAL PLANNING AND SCHEDULING UNDER UNCERTAINTY

CROSS REFERENCE TO RELATED APPLICATIONS

This application claims priority to and the benefit of U.S. Provisional Application No. 63/476,307, titled "APPARATUSES, COMPUTER-IMPLEMENTED METHODS, AND COMPUTER PROGRAM PRODUCTS FOR OPTIMIZED PLANNING PREDICTION," filed Dec. 20, 2022, the contents of which is incorporated by reference herein in its entirety.

TECHNOLOGICAL FIELD

Embodiments of the present disclosure generally relate to performing planning and/or scheduling predictions, and specifically to performing closed loop optimal planning and/or scheduling under uncertainty.

BACKGROUND

Various embodiments of the present disclosure address technical challenges related to performing planning and/or scheduling under uncertainty. Through applied effort, ingenuity, and innovation, Applicant has solved problems related to performing planning and scheduling predictions under uncertainty by developing solutions embodied in the present disclosure, which are described in detail below.

BRIEF SUMMARY

In general, embodiments of the present disclosure provide methods, apparatus, systems, computing devices, computing entities, and/or the like for generating optimized plan(s), for example including prediction(s) and/or schedule(s) of optimization actions to be performed. Other implementations for generating optimized plan(s), for example including or embodying schedule(s), will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for generating an optimized plan with respect to a target is provided. In one example embodiment, the computer-implemented method comprises: receiving. using one or more processors, input data associated with one or more industrial plants, wherein at least a portion of the input data comprises uncertain input data: generating, using the one or more processors, uncertainty-based modification data: applying at least the uncertainty-based modification data to the input data to generate updated input data; generating, using the one or more processors and based at least in part on applying the updated input data to an optimization model. predicted optimized plan comprising optimized plan data; and initiating, using the one or more processors, the performance of one or more prediction-based actions based at least in part on the predicted optimized plan.

Additionally or alternatively. in some embodiments of the example computer-implemented method, generating the uncertainty-based modification data comprises: identifying, using the one or more processors, a set of uncertain input variables associated with the uncertain input data; generating, using the one or more processors, a data distribution for each uncertain input variable in the set of uncertain input variables; and generating, using the one or more processors, the uncertainty-based modification data based at least in part on sampling the data distribution for each uncertain input variable.

Additionally or alternatively, in some embodiments of the example computer-implemented method. generating the predicted optimized plan based at least in part on applying the input data comprises: for each sampled set of uncertain input variables: optimizing, using the one or more processors and based at least in part on a priority order, a control error minimization problem for each of one or more constraint priority groups, wherein each constraint priority group is associated with a priority level; and optimizing, using the one or more processors, a profit maximization problem, wherein the profit maximization problem comprises at least a decision variable cost measure.

Additionally or alternatively, in some embodiments of the example computer-implemented method, the optimization model embodies a non-linear model predictive control.

Additionally or alternatively. in some embodiments of the example computer-implemented method. the optimization model comprises at least a feedback mechanism configured to enable closed loop planning.

Additionally or alternatively. in some embodiments of the example computer-implemented method. initiating performance of one or more prediction-based actions comprises outputting at least a portion of the optimized plan to a user interface.

Additionally or alternatively, in some embodiments of the example computer-implemented method. initiating performance of one or more prediction-based action comprises causing automatic reconfiguration of operation of at least one physical component of the one or more industrial plants based at least in part on at least a portion of the optimized plan.

In accordance with a second aspect of the disclosure, an apparatus for generating optimized plan with respect to a target is provided. In one example embodiment, the apparatus includes at least one processor and at least one memory that includes computer-coded instructions stored thereon that, in execution with the at least one processor, causes the apparatus to perform any one of the example computer-implemented methods described herein. In another example embodiment, the apparatus includes means for performing each step of any one of the example computer-implemented methods described herein.

In accordance with a third aspect of the disclosure, a computer program product for generating an optimized pan with respect to a target is provided. In one example embodiment, the computer program product includes at least one non-transitory computer-readable storage medium having computer program code stored thereon that, in execution with at least one processor, configures the computer program product for performing any one of the example computer-implemented methods described herein.

It should be appreciated that any and/or all aspects and/or operations of the example computer-implemented methods described herein may be combinable with any other of the aspects and/or operations of any other of the example computer-implemented methods described herein.

BRIEF DESCRIPTION OF THE DRAWINGS

Figure 1:
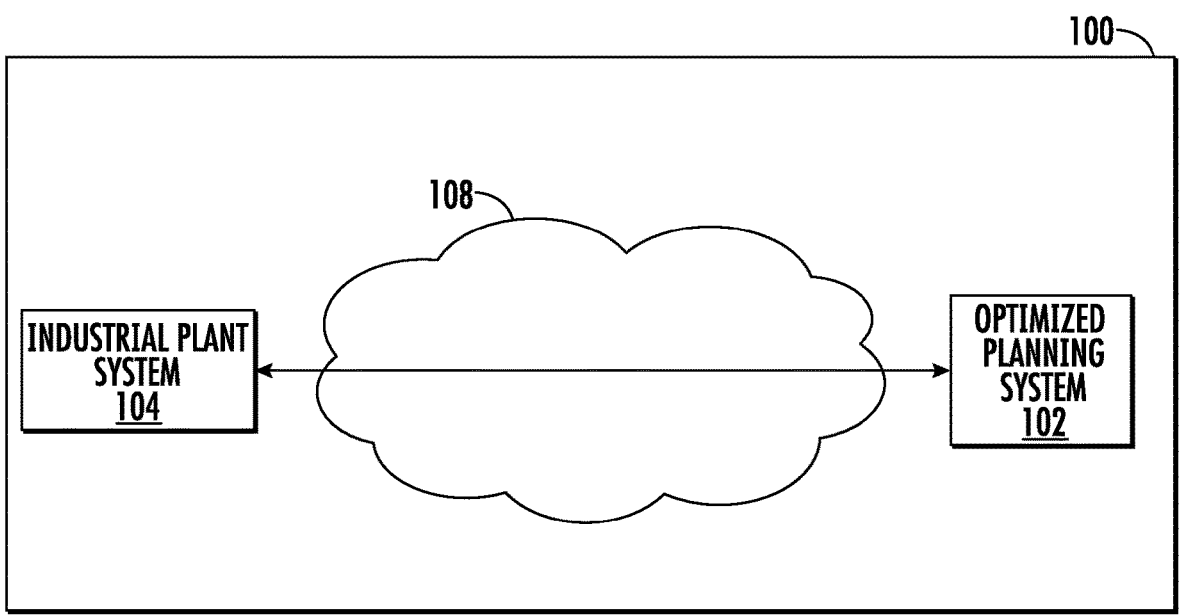
Figure 2:
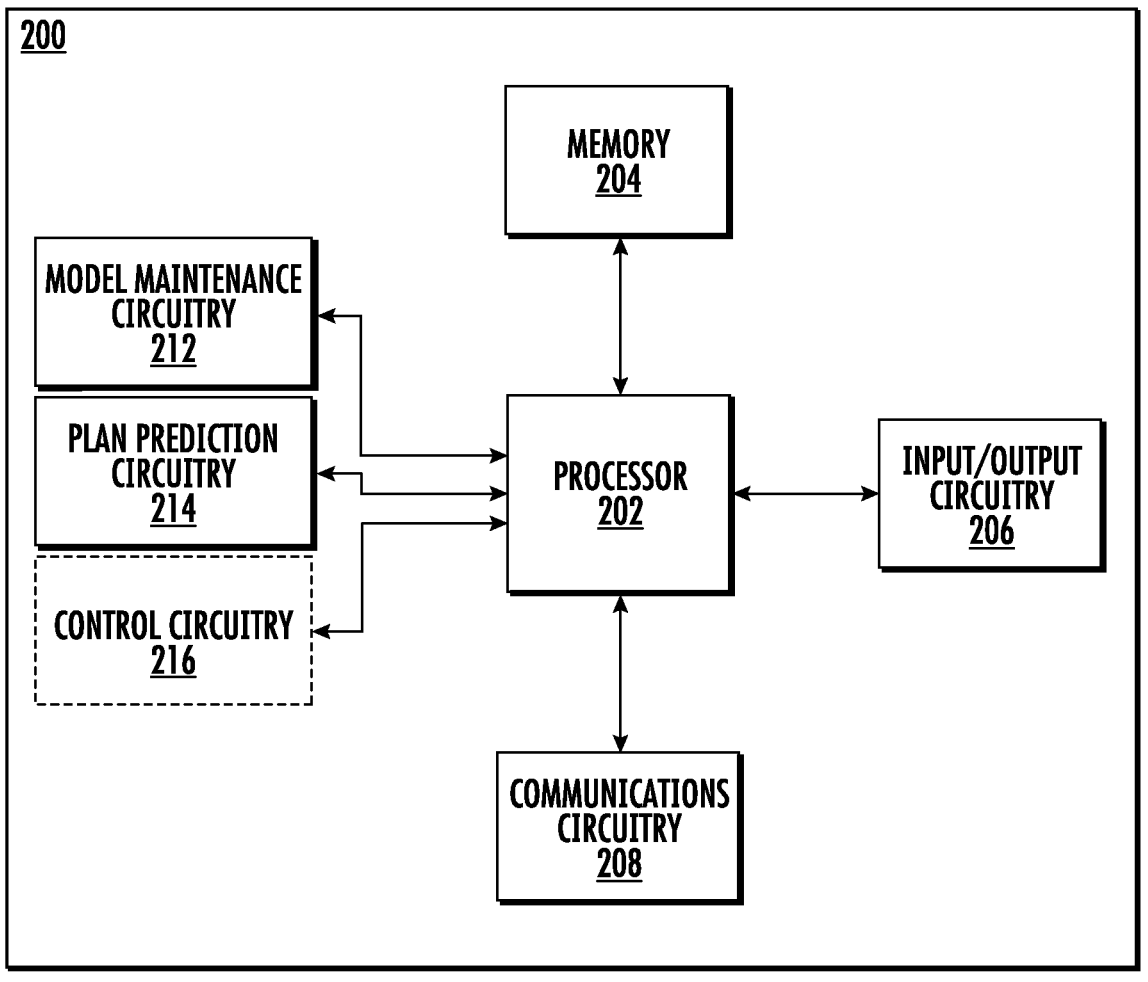
Figure 3:
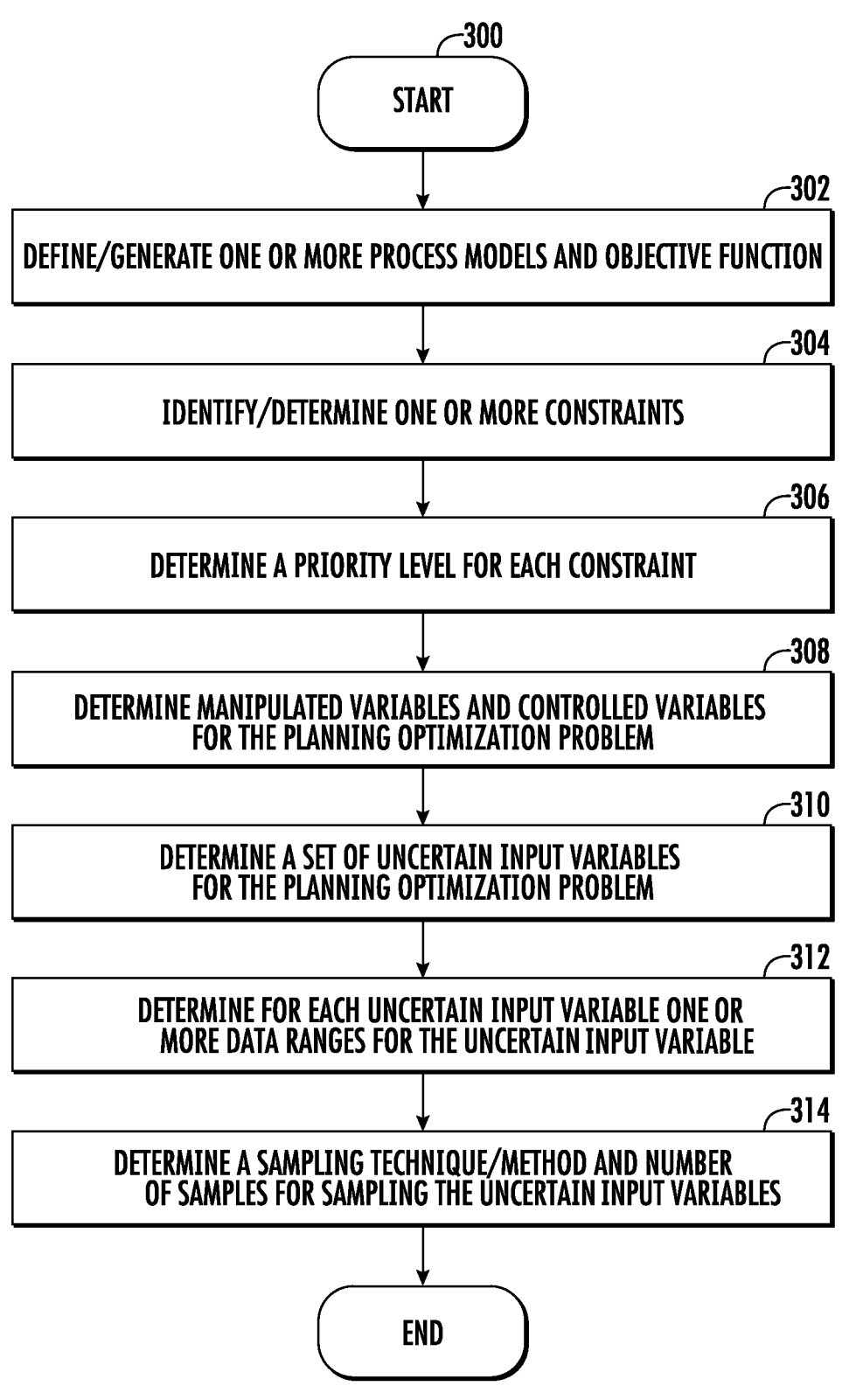
Figure 4:
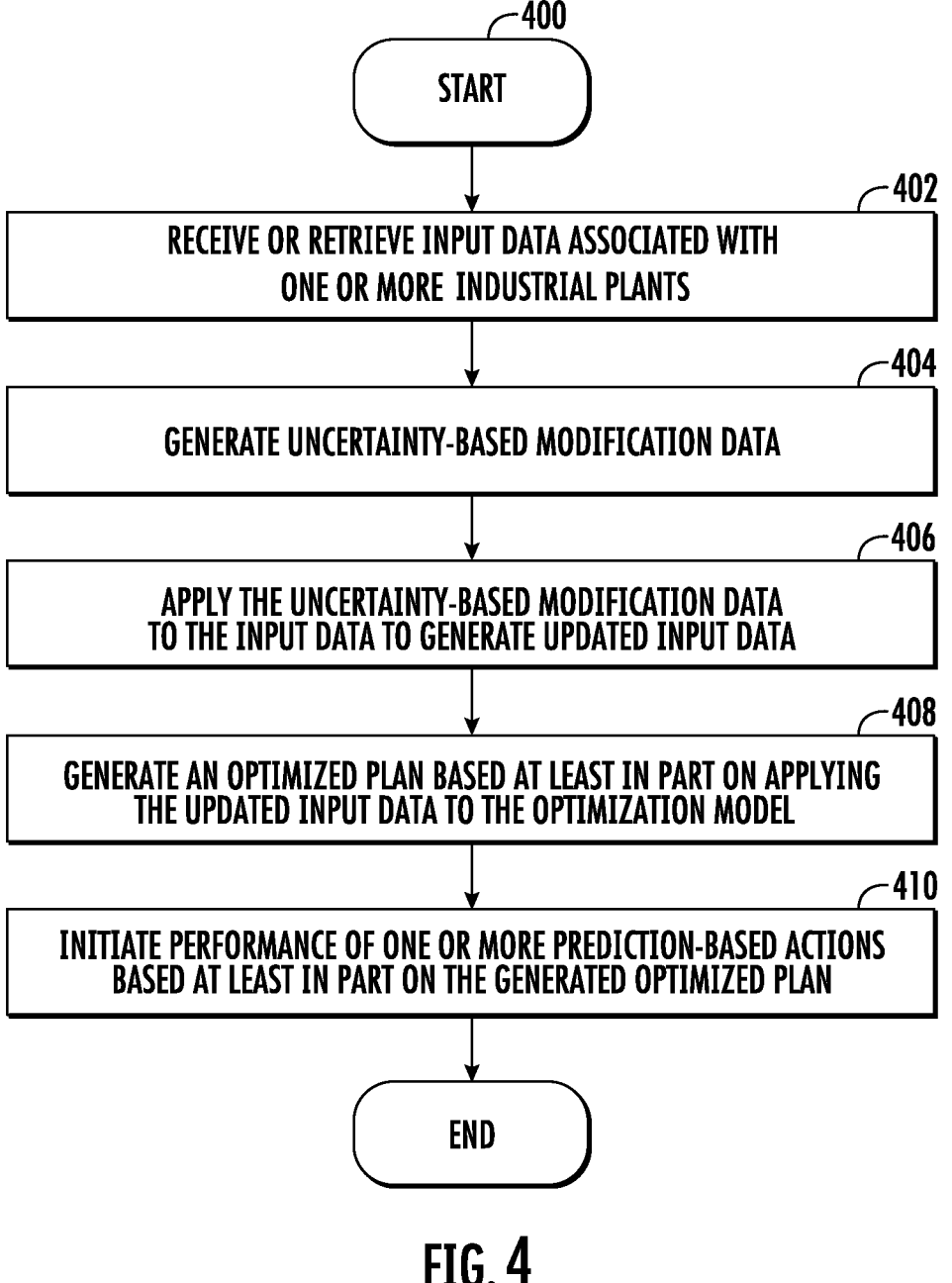
Figure 5:
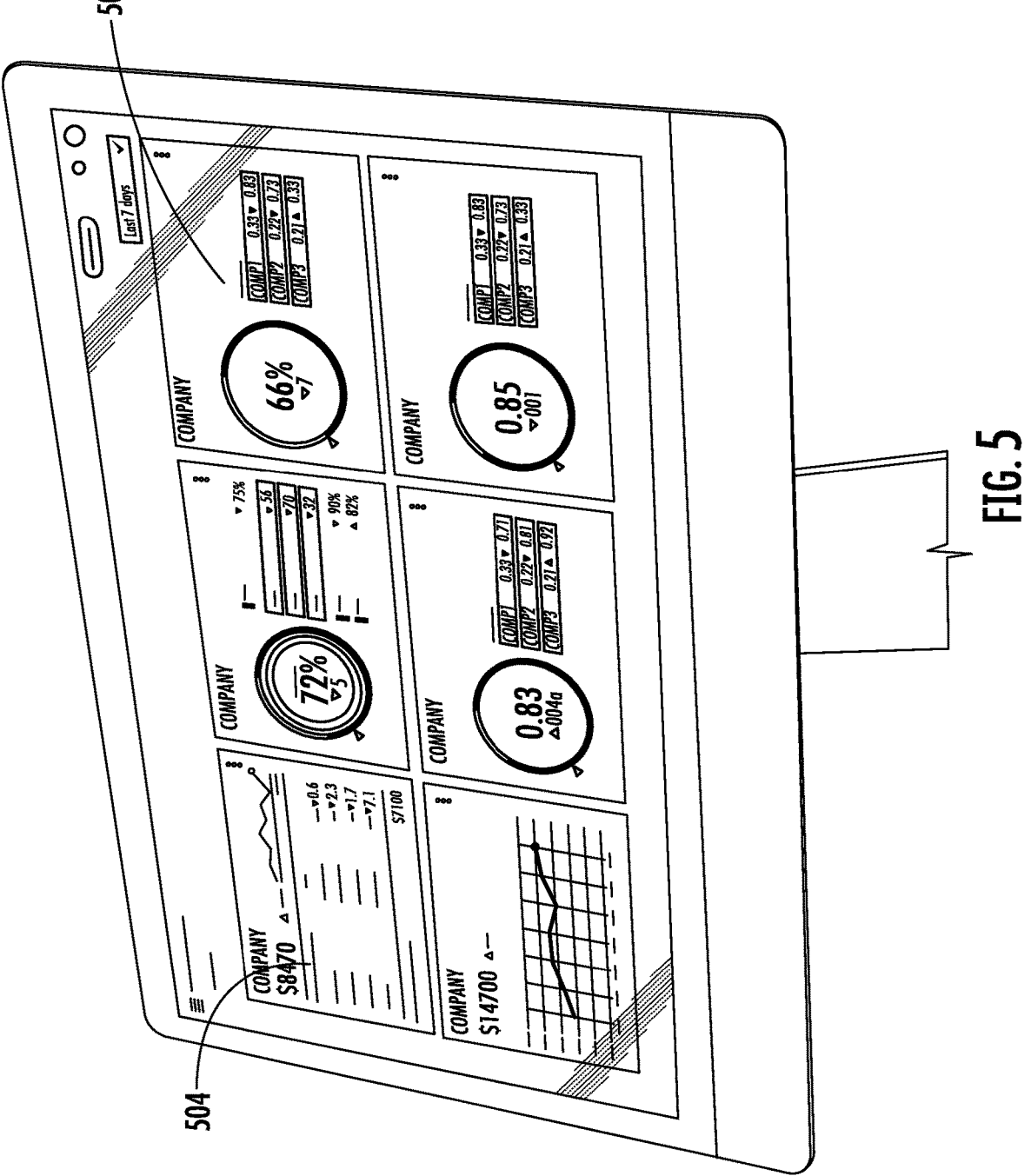

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with an example embodiment of the present disclosure;

FIG. 3 illustrates a flowchart including example operations of an example process for performing configuration operations in accordance with at least one example embodiment of the present disclosure;

FIG. 4 illustrates a flowchart including example operations of an example process for generating predicted optimized plan in accordance with at least one example embodiment of the present disclosure;

FIG. 5 illustrates an operation example of an output user interface in accordance with at least one example embodiment of the present disclosure.

Figure 6:
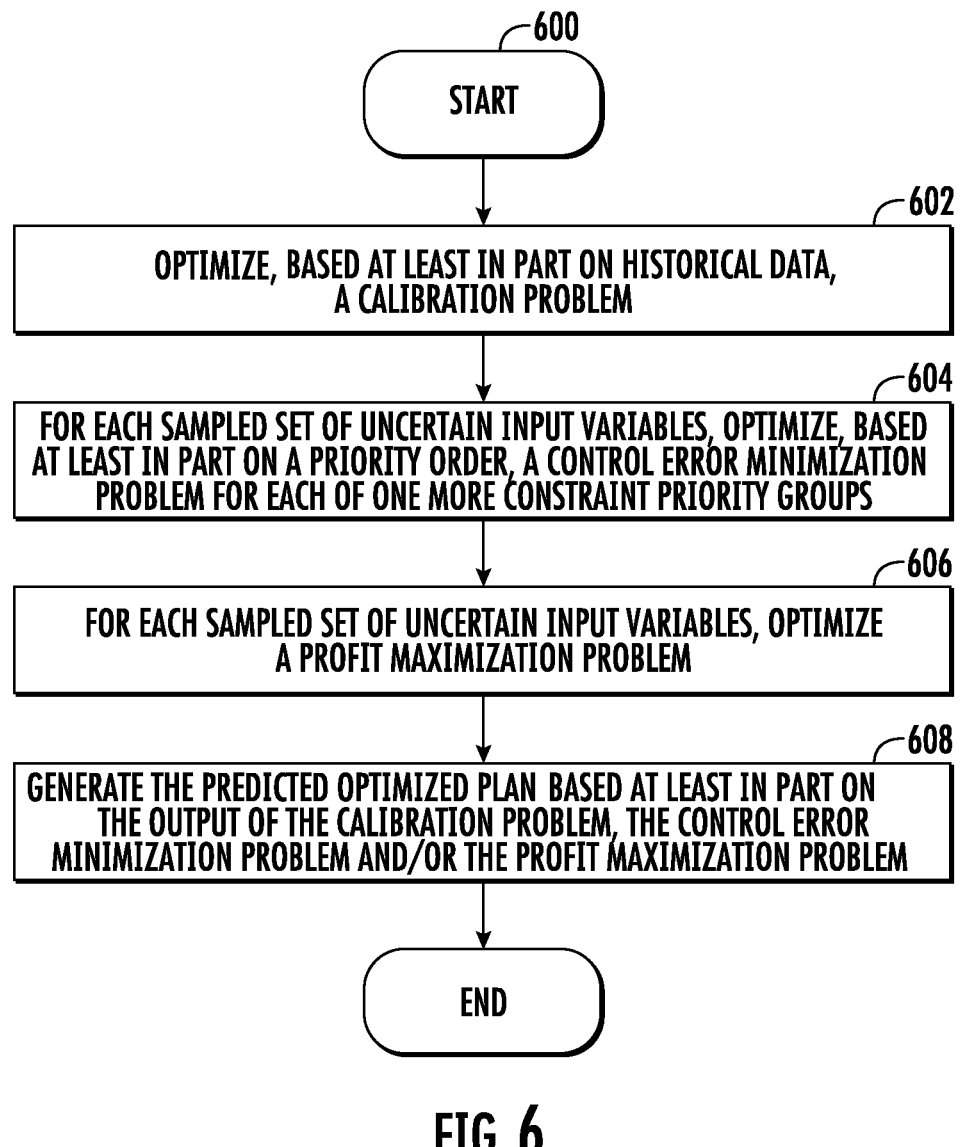

FIG. 6 illustrates a flowchart including example operations of an example process for generated predicted optimized plan in accordance with at least on example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the present disclosure may be embodied in many different forms and should not be construed as limited to the embodiments set forth herein, rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

Overview and Technical Improvements

Various embodiments of the present disclosure address technical challenges related to generating planned improvements in various domains, for example plan recommendations that are determined to improve one or more target metric(s) of a particular domain, particularly in high-dimensionality prediction domains—for example industry operation prediction domains for recommending operational plans for a particular plant, industrial control system, and/or the like (e.g., plans to achieve a target/goal such as sustainability goals). In high dimensionality prediction domains, the presence of a large number of input variables, features, factors, data, and/or similar terms used herein interchangeably; the complex relationships between those input variables, as well as the presence of uncertain data, complicates effective and computationally efficient predictive data analysis.

In the context of generating plan(s) intended to achieve sustainability goals, many corporations have made commitments to their shareholders, customers, and/or the public to achieve sustainability goals such as reaching net zero carbon emissions by a specified year. Many of these corporations have chosen the year 2050 as when they intend to reach their net zero emissions goals. In some contexts, regulatory bodies have provided similar requirements or goal targets for operating within their jurisdiction. To meet these goals related to emissions, operators of a plant, industrial control system, and/or the like, may need to make changes in various areas, including, for example, operating strategy, selection of suppliers, power contracts, equipment configurations, and/or changes to process technology involving capital investments to meet such targets. Such changes may take place at various times and may not be appropriate or even possible to perform immediately or in the near term, for example where operations may be improved over the coming years to meet said targets. Making these changes may involve processing, analyzing, modeling, and/or the like, various input data—various portions of which may include uncertain data. The uncertainty of certain data portions, for example corresponding to data values that are not fixed and may change with a market, regulatory environment, political influence, and/or the like over time, makes determining improvements with reasonable certainty particularly difficult in view of the uncertainty introduced by one or more portions of input data. Moreover, shareholders still expect corporations to grow profit margins despite these changes and constraints on emissions, which may become even tighter over time. In many implementations, it may be unclear what type of changes are required and when to make the changes to reach net zero emission goals, as well as how—or even if—such changes are feasible and implementable in a profitable way, given that it may require simultaneous consideration of many interacting factors over a long time frame.

Embodiments of the present disclosure provide for generating optimized predicted plans utilizing a particular model-based approach that specifically incorporates many of (e.g., all) the important factors for the model to ensure particular goals can be reached in an optimal way based on one or more target parameters for optimization, relevant constraints, and the like (e.g., minimizing emissions in an effective and most profitable way over a particular time interval). An optimized plan can include or be embodied by a schedule. For example, an optimized plan can include prediction(s) and/or schedule(s) of optimization actions to be performed. In one or more embodiments, the noted planning technique can be the basis of a real-time closed loop planning application that can help companies generate operational plans and project selections with schedules to meet their competing objectives with proper constraint prioritization, economic trade-offs, uncertainty quantification, and/or feedback strategy.

One or more embodiments of the present disclosure incorporate uncertainty quantification in an optimization model that embodies non-linear model predictive control. By doing so, one or more embodiments of the present disclosure improve predictive systems for generating planned improvements in various domains, including industry operation prediction domains for recommending operational plans for a particular plant, industrial control system, and/or the like. For example, by utilizing an optimization model that effectively captures uncertainty in the input data, one or more embodiments of the present disclosure improve prediction accuracy by ensuring with reasonable certainty that predicted plan(s) will meet the target goal(s) even in light of the uncertainty. This in turn ensures, as non-limiting examples, that: (i) operational and/or physical changes made in response to a predicted plan are not wasted and/or erroneous; and (ii) that recommendations provided in predicted plan(s) are not ineffective due to changes that reflect the uncertainty of particular input data. Further, by utilizing a particular model-based approach that ensures with reasonable certainty that predicted plan(s) will meet the target goal(s) even in light of the uncertainty, one or more embodiments of the present disclosure: (i) reduces or eliminates the computational operations that would otherwise be needed to generate updated plans; and (ii) reduces or eliminates the need for additional storage resources, which in turn improves storage efficiency of performing plan predictions.

Moreover, it is advantageous to review and revise predicted plans (e.g., periodically) in order to adjust and ensure progress towards the desired goals is being achieved. However, existing predictive systems (particularly in high dimensional prediction domains—such as industry operation prediction domains) do not provide for a standard or feedback mechanism for correcting prediction errors (e.g., in an instance where predicted results of a predicted plan do not match with actual results for the plan implementation). Existing methods that recommend (e.g., by a consultant) a manual review process are generally inadequate. Moreover, simulation-based approaches or other manual strategies for planning are not able to adequately address the issues associated with successfully achieving desired target goals (e.g., reaching corporate net zero emissions goals). Embodiments of the present disclosure incorporate automated feedback mechanism that at least in part enables periodic review and revision of predicted plans, such as a net zero carbon emission plan with optimized financial considerations, whereby progress towards the desired plan goal(s) can be monitored to substantially ensure progress towards these goal(s) is being achieved even in view of uncertainty of particular inputs considered by the model.

Definitions

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "industrial plant," "plant," and/or similar terms used herein interchangeably may refer to one or more buildings, complex, or arrangement of components that perform a chemical, physical, electrical, mechanical process, and/or the like for converting input materials into one or more output products. Non-limiting examples of an industrial plant include a chemical industrial plant, automotive manufacturing plant. distillery, oil refinery. fabric manufacturing plant, and/or the like.

The term "physical component" with respect to an industrial plant may refer to a real-world machine, system, or other physical structure within and/or associated with the industrial plant. and that is utilized by the industrial plant. For example. a physical component with respect to an industrial plant may comprise machine, system, or other structure that is utilized in a process performed by the industrial plant. In an example context of an oil refinery plant, non-limiting examples of a physical component may include a furnace. a pump, a heat exchanger, and/or the like.

The terms "predicted optimized plan." "optimized predicted plan," "predicted plan." "optimized plan," and similar terms may be used interchangeably to refer to a plan outputted by a predictive data analysis system incorporating one or more models. A predicted optimized plan can include or be embodied by a schedule. For example, an optimized plan can include prediction(s) and/or schedule(s) of optimization actions to be performed. The predicted optimized plan may be associated with one or more industrial plants and may comprise plan data for a specified time horizon. The one or more industrial plants, for example, may be associated with a particular entity or group of entities. (e.g., enterprise, corporations, and/or the like).

The term "optimized plan data" may refer to data corresponding to predicted optimized plan for achieving a target (e.g., target measure), such as achieving net zero emission over a specified time horizon. Optimized plan data may include various types of data. For example, optimized plan data may include values corresponding to a property of a physical component, performance data, feasibility data, and/or the like.

The term "time horizon" may refer to electronically managed data representing a length of time, such as a length of time over which a predicted optimized plan is configured to achieve desired target (e.g., net zero emission).

The term "optimization model" may refer to at least one statistical, algorithmic, and/or machine learning model that generates predicted optimized plan (e.g., comprising predicted optimized plan data) based at least in part on input data associated with, for example, one or more industrial plants.

The term "non-linear optimization model" may refer to an optimization model that is based at least in part on one or more non-linear functions.

The term "constraint type" may refer to electronically managed data representing a particular classification/category of a constraint associated with operation of one or more industrial plants with respect to a target goal or one or more target goals. Examples of constraint types include hard constraint and soft constraint.

The term "uncertainty" with respect to a variable, feature, factor, and/or similar terms used herein interchangeably may refer to a data construct that describes attributes (e.g., data value, measure, and/or the like) of a variable, such as input variable to a model, that is not fixed, may change over a given time window, and/or is unknown.

EXAMPLE SYSTEMS AND APPARATUSES OF THE DISCLOSURE

FIG. 1 illustrates a block diagram of a system that may be specially configured within which embodiments of the present disclosure may operate. Specifically, FIG. 1 depicts an example system 100. As illustrated, the system 100 includes an industrial plant system 104, in communication with an optimized planning system 102. In some embodiments, the industrial plant system 104 communicates with the optimized planning system 102 over one or more communication network(s), for example a communication network 108. In some embodiments, the optimized planning system 102 is in communication with a plurality of industrial plant systems, each identically or similarly configured to the industrial plant system 104. In some such embodiments, the optimized planning system 102 may process data associated with each industrial plant system independently, and/or in some contexts processes data associated with multiple industrial plant systems in the aggregate (e.g., when processing all industrial plant systems associated with a particular entity, region, and/or the like).

It should be appreciated that the communications network 108 in some embodiments is embodied in any of a myriad of network configurations. In some embodiments, the communications network 108 embodies a public network (e.g., the Internet). In some embodiments, the communications network 108 embodies a private network (e.g., an internal localized, or closed-off network between particular devices). In some other embodiments, the communications network 108 embodies a hybrid network (e.g., a network enabling internal communications between particular connected devices and external communications with other devices). The communications network 108 in some embodiments includes one or more base station(s), relay(s), router(s), switch(es), cell tower(s), communications cable(s) and/or associated routing station(s), and/or the like. In some embodiments, the communications network 108 includes one or more user controlled computing device(s) (e.g., a user owned router and/or modem) and/or one or more external utility devices (e.g., Internet service provider communication tower(s) and/or other device(s)).

Each of the components of the system 100 communicatively coupled to transmit data to and/or receive data from one another over the same or different wireless and/or wired networks embodying the communications network 108. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 108, the various embodiments are not limited to this architecture. In other embodiments, one or more computing entities share one or more components, hardware, and/or the like, or otherwise are embodied by a single computing device such that connection(s) between the computing entities are over the communications network 108 are altered and/or rendered unnecessary. For example, in some embodiments, the industrial plant system 104 includes some or all of the optimized planning system 102, such that an external communications network 108 is not required.

In some embodiments, the industrial plant system 104 and the optimized planning system 102 are embodied in an on-premises system within or associated with the industrial plant. In some such embodiments, the industrial plant system 104 and the optimized planning system 102 are communicatively coupled via at least one wired connection. Alternatively or additionally, in some embodiments, the industrial plant system 104 embodies or includes the optimized planning system 102, for example as a software component of a single enterprise terminal.

The industrial plant system 104 includes any number of computing device(s), system(s), physical component(s), and/or the like, that facilitates producing of any number of products, for example utilizing particular configurations that cause processing of particular inputs available within the industrial plant system 104. In some embodiments, the industrial plant system 104 includes one or more physical component(s), connection(s) between physical component(s), and/or computing system(s) that control operation of each physical component therein. The industrial plant system 104, for example, can embody an oil refinery, an automotive engine manufacturing plant, a distillery, and/or or the like, which includes physical component(s) that perform particular process(es) to alter properties of inputs to the component(s). Additionally or alternatively, in some embodiments the industrial plant system 104 includes one or more computing system(s) that are specially configured to operate the physical component(s) in a manner that produces one or more particular product(s) simultaneously. In some embodiments, an industrial plant system 104 includes one or more computing device(s) and/or system(s) embodied in hardware, software, firmware, and/or a combination thereof, that configure and/or otherwise control operation of one or more physical component(s) in the corresponding industrial plant(s). For example, in some embodiments, such computing device(s) and/or system(s) include one or more programmable logic controller(s), MPC(s), application server(s), centralized control system(s), and/or the like, that control(s) configuration and/or operation of at least one physical component. It will be appreciated that different industrial plant system(s) may include or otherwise be associated with different physical component(s), computing system(s), and/or or the like.

The optimized planning system 102 includes one or more computing device(s) and/or system(s) embodied in hardware, software, firmware, and/or a combination thereof, that can generate one or more predicted optimized plans associated with operation of one or more industrial plants or particular sub-components thereof. The one or more predicted optimized plans comprise optimized plan data, for example, associated with one or more physical components, assets, and/or the like associated with the one or more industrial plants. The one or more predicted optimized plan for example, may comprise a plan(s) to achieve net zero emission within a specified time horizon. The one or more predicted optimized plan can include or be embodied by schedule(s). For example, an optimized plan can include prediction(s) and/or schedule(s) of optimization actions to be performed. In some embodiments, the optimized planning system 102 generates a predicted optimized plan utilizing one or more models, such as an optimization model embodying a model predictive control (e.g., a non-linear model predictive control (NMPC)). In some embodiments, the optimized planning system 102, utilizing an optimization model, may be configured to formulate and/or optimize one or more planning optimization-related problems associated with the optimization model in order to generate a predicted optimized plan that effectively accounts for uncertainty in the input data. The optimized planning system, for example, may perform one or more modeling operations that facilitates prediction of an optimized plan associated with the operation of one or more industrial plants based at least in part on input data associated with the one or more industrial plants and that are inputted into, applied to, and/or the like to the optimization model.

In some embodiments, the optimized planning system 102 includes one or more application server(s) and/or database server(s) that provide such functionality. Additionally or alternatively. in some embodiments, the optimized planning system 102 includes one or more client device(s), user device(s), and/or the like, that enable access to the functionality provided via the optimized planning system 102. for example via a web application, a native application, and/or the like executed on the client device.

Additionally or alternatively, in some embodiments, the optimized planning system 102 may be utilized to facilitate control and/or automatic reconfiguration of the operation of one or more physical component(s) in one or more industrial plants. In some embodiments, the optimized planning system 102 includes or embodies a display or other user interface to which a user-facing interface is renderable.

In some embodiments, the optimized planning system 102 and/or industrial plant system 104 communicate with one another to perform the various actions described herein. For example, in some embodiments, the optimized planning system 102 and the industrial plant system 104 communicate to generate predicted optimized plan(s) comprising optimized plan data associated with operation of one or more industrial plants, or particular sub-components thereof. Additionally or alternatively, in some embodiments, the optimized planning system 102 and the industrial plant system 104 communicate to facilitate control or adjustment of operation of physical component(s) in the one or more industrial plants based at least in part on the generated predicted optimized plan. For example, in some embodiments the optimized planning system 102 and the industrial plant system 104 communicate to automatically configure or reconfigure one or more physical component(s) of the one or more industrial plants in accordance with the predicted optimized plan.

FIG. 2 illustrates a block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. In some embodiments, the optimized planning system 102, and/or a portion thereof is embodied by one or more system(s), such as the apparatus 200 as depicted and described in FIG. 2. The apparatus 200 includes processor 202, memory 204, input/output circuitry 206, communications circuitry 208, model maintenance circuitry 212, plan prediction circuitry 214, and optional control circuitry 216. In some embodiments, the apparatus 200 is configured, using one or more of the sets of circuitry 202, 204, 206, 208, 212, 214, and/or 216, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with generating predicted optimized plan(s) using at least one specially configured model (e.g., optimization model). In some embodiments, the processor 202 includes hardware, software, firmware, and/or a combination thereof, that determines results for one or more problem formulations associated with the specially configured model. In some embodiments, the processor 202 includes hardware, software, firmware, and/or a combination thereof, that generates predicted optimized plan (comprising optimized plan data) associated with one or more industrial plants utilizing an optimization model incorporating a model predictive control, such as an NMPC. In some embodiments, the optimization model generates predicted optimized plan(s) associated with one or more industrial plants based at least in part on input data with uncertainty quantification and associated with operation of the one or more industrial plants. Additionally or alternatively, in some embodiments, the processor 202 includes hardware, software, firmware, and/or a combination thereof, that outputs the predicted optimized plan(s). Additionally or alternatively, in some embodiments, the processor 202 includes hardware, software, firmware, and/or a combination thereof, that facilitates reconfiguration of the operation of at least one physical component based at least in part on the predicted optimized plan(s).

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

The model maintenance circuitry 212 includes hardware, software, firmware, and/or a combination thereof, that supports configuration and/or generation of one or more specially configured model(s) utilized to generate predicted optimized plan(s) for one or more industrial plants—such as operational plan(s) for a particular industrial plant to achieve reduced emission (e.g., achieve net zero emission within a specified time horizon). In some embodiments, the model maintenance circuitry 212 includes hardware, software, firmware, and/or a combination thereof, that performs one or more configuration operations and/or stores model configuration data with respect to the optimization model. In some embodiments, the model maintenance circuitry 212 includes hardware, software, firmware, and/or a combination thereof, that stores the optimization model. In some embodiments, the model maintenance circuitry 212 includes hardware, software, firmware, and/or a combination thereof, that updates the optimization model. In some embodiments, the model maintenance circuitry 212 includes hardware, software, firmware, and/or a combination thereof, that stores historical predicted plans and/or corresponding implementation results. In some embodiments, the model maintenance circuitry 212 includes hardware, software, firmware, and/or a combination thereof, that updates the optimization model. In some embodiments, the model maintenance circuitry 212 includes hardware, software, firmware, and/or a combination thereof, that receives or retrieves (e.g., from one or more databases) input data for the optimization model. In some embodiments, the model maintenance circuitry 212 includes a separate processor, specially configured field programmable gate array (FPGA), or a specially programmed application specific integrated circuit (ASIC).

The plan prediction circuitry 214 includes hardware, software, firmware, and/or a combination thereof, that supports generation of at least one predicted optimized plan (that accounts for uncertainty associated with operation of corresponding industrial plant(s)) utilizing at least one model (e.g., optimization model). For example, in some embodiments, the plan prediction circuitry 214 includes hardware, software, firmware, and/or a combination thereof, that receives input data associated with operation of one or more industrial plants (e.g., one or more physical component(s), product(s), and/or the like of the one or more industrial plants thereof). Alternatively or additionally, in some embodiments, the plan prediction circuitry 214 includes hardware, software, firmware, and/or a combination thereof, that generates at least one predicted plan or portion of a predicted plan associated with a particular component (e.g., physical component, asset, and/or the like) of one or more industrial plants utilizing the at least one model (e.g., optimization model) that incorporates uncertainty quantification. In some embodiments, the plan prediction circuitry 214 utilizes an optimization model embodying a non-linear model predictive control (NMPC). In some embodiments, the plan prediction circuitry 214 utilizes data associated with one or more component(s) (e.g., physical components(s), assets, and/or the like) as input to the optimization model. In some embodiments, the plan prediction circuitry 214 includes hardware, software, firmware, and/or a combination thereof, that outputs the at least one predicted optimized plan. In some embodiments, the plan prediction circuitry 214 includes a separate processor, specially configured field programmable gate array (FPGA), or a specially programmed application specific integrated circuit (ASIC).

The optional control circuitry 216 includes hardware, software, firmware, and/or a combination thereof, that supports various functionality associated with causing configuration or causing other operation of at least one physical component of one or more industrial plants. For example, in some embodiments, the control circuitry 216 includes hardware, software, firmware, and/or a combination thereof, that facilitates and/or causes automatic reconfiguration of the operation of at least one physical component based at least in part on at least a portion of the predicted optimized plan. For example, in some embodiments, the control circuitry 216 includes hardware, software, firmware, and/or a combination thereof, that configures and/or reconfigures (e.g., automatically configures and/or reconfigures) operation of at least one physical component (e.g., processing machine) of one or more industrial plants in accordance with the predicted optimized plan that accounts for uncertainty associated with operation of the one or more industrial plants. In some embodiments, the control circuitry 216 includes a separate processor, specially configured field programmable gate array (FPGA), or a specially programmed application specific integrated circuit (ASIC).

Additionally or alternatively, in some embodiments, two or more of the sets of circuitries 202-208 and 212-216 are combinable. Alternatively or additionally, in some embodiments, one or more of the sets of circuitry perform some or all of the functionality described associated with another component. For example, in some embodiments, two or more of the sets of circuitry 202-208 and 212-216 are combined into a single module embodied in hardware, software, firmware, and/or a combination thereof. Similarly, in some embodiments, one or more of the sets of circuitry, for example the model maintenance circuitry 212, plan prediction circuitry 214, and/or optional control circuitry 216, is/are combined with the processor 202, such that the processor 202 performs one or more of the operations described above with respect to each of these sets of circuitry 212-216.

EXAMPLE OPTIMIZATION MODEL OF THE DISCLOSURE

Having described example systems and apparatuses in accordance with the present disclosure, example optimization model of the disclosure will now be discussed. In some embodiments, one or more computing system(s) and/or device(s) is/are specially configured to maintain and/or generate the optimization model for use in generating predicted optimized plan(s) comprising optimized plan data and that account for uncertainty associated with operation of corresponding industrial plant(s). Specifically, the optimization model may be specially configured to address uncertainty associated with one or more portions of input data to be processed. In some embodiments, the optimization model is generated, implemented by, and/or otherwise maintained by an optimized planning system 102, for example, embodied by the apparatus 200 as described herein.

In some embodiments, the optimization model is utilized to generate predicted optimized plan(s) for one or more industrial plants, wherein the predicted optimized plan can include or be embodied by a schedule. For example, the predicted optimized plan can include prediction(s) and/or schedule(s) of optimization actions to be performed. In some embodiments, the optimization model embodies (or otherwise includes) a non-linear model predive control (NMPC) that account for uncertainty associated with portions of input data to be processed. NMPC in the context of emissions may describe a generalization of model predictive control to simultaneously handle economic, safety, quality, and/or various control objects (such as emissions control objectives) in an optimization-based approach utilizing non-linear models and with a combination of continuous and discrete decision variables. In some embodiments, the optimization model embodies NMPC that can optimize large scope problems for planning with time horizon of various duration, including long time horizons (e.g., time horizons in the order of years, such as 5, 10, 20 years, or longer using, for example, Net Present Value calculations). In some embodiments, the NMPC incorporates an uncertainty formulation to achieve the desired plan goal so as to account for the noted uncertainty in one or portions of input data to be processed in order to generate optimized plan(s). In the context of sustainability goals (e.g., emission reduction), for example, the optimization model may employ a multi-level NMPC to optimize planning (e.g., optimize planning optimization problem) over a time horizon with an appropriate uncertainty formulation that is optimal to attain emissions goals. For example, in some embodiments, the optimization model is configured to optimize long horizon optimization problems that include or otherwise effectively account for uncertainty in one or more portions of the input data (e.g., uncertain input data).

In some embodiments, the optimization model comprises a steady state model for each subsystem of one or more subsystems of one or more industrial plants in each time interval t=0, . . . , $n_p$, where $n_p$ may represent the number of prediction intervals into the future. Model decision variables can be any combination of continuous and discrete variables. Discrete variables can only take on integer variables or could be binary variables (0 or 1) and include decisions like "yes/no" for project selection or rejection in a particular time period or "on/off" for equipment in or out of service in particular time periods. In some embodiments, the optimization model may be represented as:

$$f(x_t,u_t,v_t,y_t,e_t,a,b)=0 \qquad \text{Equation 1}$$

f=nonlinear equations for the system model
$x_t$=model state variables at time t
$u_t$=model decision variables at time t
$v_t$=uncertain input variables at time t
$y_t$=model output variables at time t
$e_t$=model prediction error variables at time t
a=model gain parameters
b=model bias parameters In some embodiments, the optimization model (e.g., represented in equation 1 above) may comprise base process function(s) g and feedback model function(s) having parameterized functions to correct the output of the optimization model.

$$g(x_t,u_t,v_t)=0 \quad y_t=\text{diag}(a)x_t+b \quad x_t-y_t-e_t=0 \qquad \text{Equation 2}$$

In some embodiments, the feedback model functions(s) may define a linear model correction with a gain a and bias term b for the prediction error for each historical time interval (t≤0). In some embodiments, the feedback model comprise a machine learning model.

In equations 1 and 2 above, $u_t$ may represent manipulated variables and $y_t$ may represent controlled variables. In some embodiments, manipulated variables may include continuous and/or discrete decision variables (e.g., data, time, and/or the like to execute projects associated with the one or more industrial plants; interval between execution of the projects; site/building of one or more sites/buildings associated with the one or more industrial plant; and/or the like). In some embodiments, controlled variables may include process constraints, emission constraints, project constraints, capital cost constraints, general resource constraints and/or the like. The planning optimization problem may comprise one or more constraints. In some embodiments, the constraints in the planning optimization problem may include lower and upper limits on the manipulated and controlled variables at each time point into the future (e.g., as represented below).

$$y_L \leq y_t \leq y_U \quad u_L \leq u_t \leq u_U \qquad \text{Equation 3}$$

In some embodiments, each constraint in the planning optimization problem may be associated with a constraint type of one or more constraint types. Examples of constraint types include soft constraint and hard constraint. Hard constraints may describe a constraint having highest priority and that may not be violated. Non-limiting examples of hard constraints include safety constraints. For example, in some embodiments, each constraint may be classified/categorized as a hard constraint or a soft constraint. In some embodiments, constraints on manipulated variables may be classified as hard constraints. In some embodiments, soft constraints may be allowed to be violated, for example, if there are not enough manipulated variables to meet control objectives associated with the optimization model. In some embodiments, a soft constraint may be relaxed based at least in part on a priority level associated with the soft constraint. For example, in some embodiments, each constraint may be associated with a priority level of a plurality of priority levels, and a given soft constraint may be relaxed based at least in part on the priority level associated with the soft constraint. In the context of generating predicted optimized plan for reducing emissions, for example, emission constraints violations can be prioritized relative to product quality and/or other constraints. In some embodiments, lower constraints and upper constraints of a given variable may be associated with (e.g., assigned) different priority levels. In some embodiments, a user provides information defining a particular constraint, and indicates whether the constraint is a hard constraint or a soft constraint. In some embodiments, constraints are categorized and determined as hard or soft constraint based on the type/category of constraint (e.g., safety constraints may be designated a hard constraint that cannot be violated, financial constraints may be designated a soft constraint that is flexible but still to be optimized for, and the like).

Alternatively or additionally, in some embodiments a constraint can be defined on the rate of change of the variable (e.g., manipulated variable, controlled variable). The lower limit $y_L$, and upper limit $y_L$ can be represented as functions of time to define general reference trajectories. In the context of net zero emissions plan prediction, for example, there can be a specified minimum rate of approach to net zero emissions to ensure progress is made at a specified periodicity (e.g., annual). For example, the minimum rate of approach may embody a constraint to ensure annual progress is made towards a target. In some embodiments, terminal constraints specifying net zero emissions can be specified in the planning optimization problem and can be separately prioritized. In some embodiments, using the noted rate of change constraint approach can ensure progress is made at each time period moving toward the net zero emissions constraint in the future.

In some embodiments, when each hard constraint is satisfied and soft constraint violations are minimized in accordance with a priority order based at least in part on associated priority level, profit maximization may automatically be performed. In some embodiments, a minimum movement formulation may be applied to ensure minimal changes to current operating policies, and/or the like, are made to achieve the planning optimization problem objectives—for example, in an instance where similar results for multiple policies exist. The absolute value of the change in the decision variables $$\Delta u_t^{abs}$$

can be associated with a cost to accomplish the minimum movement objective. In some embodiments, a total profit P over the prediction horizon (e.g., sum of the profit in each time interval t) may represent the objective function to maximize when the constraint violations have been minimized. In some embodiments, the total profit P may be determined by performing the operations of the below equation:

$$P = \sum_{t=0}^{n_p} P_t = \sum_{t=0}^{n_p} c_y^T y_t + c_u^T u_t + c_v^T v_t + c_{\Delta u}^T \Delta u_t^{abs} \qquad \text{Equation 4}$$

$P$ = total profit over the prediction horizon $P_t$ = Profit in time period $t$ $c_y$ = cost associated with model output variable $y_t$ $c_u$ = cost associated with decision variable $u_t$ $c_v$ = cost associated with uncertain variable $v_t$ $c_{\Delta u}$ = cost associated with a change model decision variable $u_t$ $\Delta u_t^{abs}$ = absolute value of change in decision variable $u_t$ $n_p$ = number of time periods in the prediction horizon In some embodiments, as noted above, the optimization model incorporates a feedback mechanism. The feedback mechanism may be configured to provide feedback to update the parameters of the optimization model and output biases. This feedback mechanism enables a closed loop performance to ensure predictions converge to actual measurements from the processes associated with the one or more industrial plants. In some embodiments, the feedback mechanism includes optimizing a calibration problem. Optimizing the calibration problem may comprise using historical input data (e.g., input data from past history) associated with historical predicted plans (e.g., past predicted plans) to optimize the optimization model. For example, biases between historical predicted plans and corresponding actual measurements (e.g., emissions measurements) may be determined and/or learned and incorporated into the optimization model. The noted calibration problem configuration may be configured to minimize prediction error. In some embodiments, a control sub-problem and an optimization sub-problem may be configured (e.g., optimized) for controlling and optimizing the optimization model predictions respectively, whereby the optimization model predictions may be forced to converge to process outputs in order to have an optimal (e.g., successful) closed loop system. The calibration operation may be performed utilizing one or more of a variety of techniques. In some example embodiments, the calibration operation is performed using machine learning techniques. In the noted example embodiments, historical data is collected and machine learning regression method(s) (and/or other machine learning methods) is used with data driven and/or hybrid models to calculate the overall predictions to match the observed data. In some example embodiments, the calibration operation is performed using Moving Horizon Estimation (MHE) technique. In some embodiments, the model parameters can be selected such that a weighted $L_1$ norm of past prediction errors is minimized by choosing optimal (e.g., appropriate) model parameters. The choice of $L_1$ norm of prediction errors can be better than $L_2$ norm if gross errors are present in the measurements and the measurement error does not follow a Gaussian distribution. Depending on the requirements, the minimization of a certain $L_q$ norm of the prediction error could be appropriate.

In some embodiments, the calibration operation is performed based at least in part on measured values of past inputs and outputs at each model execution cycle. In some embodiments, the calibration operation comprise optimizing a calibration problem for $n_h$ steps of historical data. In some embodiments, the calibration problem may be optimized for $n_h$ steps of historical data by performing the operations of the below equation:

$$\underset{a,b}{\text{minimize}} \ \ \varphi_0 = \sum_{t=-n_h}^{0} \|e_t\|_q \qquad \text{Equation 5}$$

subject to $g(x_t, u_t, v_t) = 0, \ \ t = -n_h, \ldots, 0$ $y_t = \text{diag}(a)x_t + b, \ \ t = -n_h, \ldots, 0$ $x_t - y_t - e_t = 0, \ \ t = -n_h, \ldots, 0$ $y_L \le y_t \le y_U, \ \ t = -n_h, \ldots, 0$ $u_L \le u_t \le u_U, \ \ t = -n_h, \ldots, 0$ $\psi_0$=calibration objective function
$\|e_t\|_q$=$L_q$ norm of the prediction error variables $e_t$
$n_h$=number of past history time periods for calibration In some embodiments, optimizing the calibration problem (e.g., MHE calibration problem) comprises determining optimal values for a and b. In equation 5, in an instance where $n_h$=1, the parameters a may be fixed to their default values, for example, due to there being adequate history to estimate the noted parameters. The control horizon may be moving forward in time at a specified execution frequency, whereby the feedback mechanism (e.g., embodying a feedback algorithm, such as a machine learning algorithm) may be configured to correct and recalibrate the optimization model at each model execution cycle to enable closed loop planning. With closed loop planning, results of past plan(s) (e.g., from previous execution cycle(s)) generated utilizing the optimization model can be used by the optimization model in generating predicted plans for the current execution cycle and/or future execution cycles. In some embodiments, responsive to determining optimal values for a and b, these values may be fixed in the subsequent control sub-problem and/or optimization sub-problems. In some embodiments, the calibration problem configuration may incorporate a filtering technique/approach, for example, to allow a tuning factor for each measured value. In some embodiments, outputs for current goal trajectories (e.g., emissions trajectories) from the planning optimization problem can be used as proxy constraints in lower level plant wide and building optimization applications, for example, to enforce a consistent enterprise-wide strategy (e.g., consistent corporate execution strategy). This, in turn, may provide a methodology for coordination of optimization and control at different levels in the enterprise.

As described above, a given constraint may be assigned a priority level. For example each constraint may be associated with a priority group of a plurality of priority groups. A given priority group, for example, may correspond to a particular priority level. In some embodiments, for each priority level, a control error is minimized over the prediction time horizon. In some embodiments, the control error minimization problem may be optimized by performing the operations of the below equation:

$$\text{minimize}_{u_t,\delta_{L_t}\delta_{U_t}} = \sum_{t=1}^{n_p}\left(\sigma_L^T D_j \delta_{L_t} + \sigma_U^T D_j \delta_{U_t}\right) \qquad \text{Equation 6}$$

subject to $$g(x_t, u_t, v_t) = 0, \quad t = 1, \ldots, n_p$$

$$y_t = \text{diag}(a)x_t + b, \quad t = 1, \ldots, n_p$$

$$0 \le \delta_{L_t} \le \delta_{L_t}^*, \quad t = 1, \ldots, n_p$$

$$0 \le \delta_{U_t} \le \delta_{U_t}^*, \quad t = 1, \ldots, n_p$$

$$y_L - \delta_{L_t} \le y_t \le y_U + \delta_{U_t}, \quad t = 1, \ldots, n_p$$

$$u_L \le u_t \le u_U, \quad t = 1, \ldots, n_p$$

In equation 6: (i) $D_j$ may represent a diagonal matrix that: (a) contains 1 in the position $d_{ii}$ in an instance where the constraint i is in priority group j and (b) contains 0 in the position $d_{ii}$ in an instance where the constraint i is in priority group j; (ii) $\sigma_L$ and $\sigma_U$ may represent weights, and can be set to 1 or tuned to trade off violation error for constraints with the same group of priority. Responsive to optimizing the error minimization problem for each priority level, the optimal solutions $\delta_{L_t}$ and $\delta_{U_t}$ may be fixed to constrain the violations to be no worse that the optimal violations. This may, for example, make each priority level infinitely more important than the next lower priority and profit maximization may be performed only after all violations have been minimized. With a calibrated model using optimized parameters (a, b) and constraint violations $\delta_{L_t}$, $\delta_{U_t}$, minimized according to priority and incorporated as constraints, the following profit maximization problem can be optimized:

$$\text{maximize}_{u_t,\delta_{L_t}\delta_{U_t}} \varphi_{p+1} = \sum_{t=1}^{n_p}(F_t(y_t, x_t, u_t, v_t)) \qquad \text{Equation 7}$$

subject to $$g(x_t, u_t, v_t) = 0, \quad t = 1, \ldots, n_p$$

$$y_t = \text{diag}(a)x_t + b, \quad t = 1, \ldots, n_p$$

$$0 \le \delta_{L_t} \le \delta_{L_t}^{max}, \quad t = 1, \ldots, n_p$$

$$0 \le \delta_{U_t} \le \delta_{U_t}^{max}, \quad t = 1, \ldots, n_p$$

$$y_L - \delta_{L_t} \le y_t \le y_U + \delta_{U_t}, \quad t = 1, \ldots, n_p$$

$$u_L \le u_t \le u_U, \quad t = 1, \ldots, n_p$$

$\varphi_{p+1} = $ profit objective function $F_t = $ profit in time period $t$

If there are no revenue generating functions in the optimization model, then the profit maximization problem above automatically can become a total cost minimization problem over the same time horizon.

As noted above, input data to the optimization model may include uncertain data (e.g., a portion of the input data may comprise uncertain data). For example, given that the control and optimization sub-problem for a planning optimization problem may have a time horizon that can be over many years, a proper uncertainty formulation may be generated/ determined in order to make the model solutions more robust to uncertainty in the input data. In some embodiments, the uncertainty formulation may be based at least in part on a stochastic problem formulation. For example, in some embodiments, a stochastic problem formulation is formulated for optimization under uncertainty. In some embodiments, generating the uncertainty formulation may comprise determining/configuring a representative distribution for each uncertain input variable of one or more uncertain input variables. In the context of generating predicted plans to achieve specified emissions target (e.g., net zero emissions), examples of uncertain input variables may include the price of certain materials that impact emissions (e.g., price of natural gas, emissions benefit from a particular project associated with the one or more industrial plants, and/or the like). In some embodiments, a distribution type may be configured for each input variable. In some embodiments, the representative distribution may be determined/ configured based at least in part on historical data associated with the particular uncertain input variable. An upper limit and a lower limit may then be selected for each input variable based at least in part on the representative distribution. A set of values corresponding to the input variables may be generated based at least in part on the upper and lower limits using one or more sampling techniques/methods (e.g., simple random sampling, cluster sampling, systemic sampling, stratified sampling, convenience sampling, and/or other sampling techniques/methods). These set of values may define ns scenarios which may be optimized (e.g., simultaneously) using, for example, the same decision variables for each scenario. In some embodiments, the uncertainty problem may be optimized by performing the operations of the below equation:

$$\text{minimize}_{u_T} \phi = P(\varphi_i(y_i, x_i, u_i, v_i)) \qquad \text{Equation 8}$$

subject to $$g_i(x_i, u_i, v_i) = 0, \quad i = 1, \ldots, n_s$$

$$y_i = \text{diag}(a)x_i + b, \quad i = 1, \ldots, n_s$$

$$u_T - u_i = 0, \quad i = 1, \ldots, n_s$$

$$y_L \le y_i \le y_U, \quad i = 1, \ldots, n_s$$

$$u_L \le u_i \le u_U, \quad i = 1, \ldots, n_s$$

In equation 8, for this problem, each variable is now represented by a value in each time period as well as a value in each scenario. This enables simultaneous consideration of all scenarios of uncertain data and computes a single set of decision variables that is optimal for all scenarios according to the objective function type choice.

In equation 8: (i) P may represent an objective function and may comprise and/or represent a cumulative distribution function such as the expected value, mode, variance or fractiles; (ii) $u_T$ may represent master decision variables for each scenario/case and may be forced upon each scenario by $u_T - u_i = 0$. In some embodiments, the calibration problem need not be included in this multi-scenario problem, because the historical and current data is known and there are no uncertain values. The control and profit maximization problems can be optimized by the multi-scenario formulation since they do incorporate uncertain input values.

Considering, that each sub-problem of the planning optimization problem may comprise a sequence of problems, as described above, Alternating Direction Method of Multipliers (ADMM) may be used to decompose the problem into more tractable sub-problems that can be optimized iteratively and in parallel.

EXAMPLE COMPUTER-IMPLEMENTED
PROCESSES OF THE DISCLOSURE

Having described example systems, apparatuses, data architectures, and model implementations in accordance with the present disclosure, example processes for generating an optimized plan using NMPC will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

In some embodiments, generating an optimized plan utilizing a model predictive control, such as an NMPC, may comprise performing one or more configuration operations. FIG. 3 illustrates a flowchart including example operations of an example process for performing configuration operation(s) associated with generating predicted optimized plans. Specifically, FIG. 3 illustrates an example computer-implemented process 300. In some embodiments, the process 300 is embodied by computer program code stored on a non-transitory computer-readable storage medium of a computer program product configured for execution to perform the process as depicted and described. Alternatively or additionally, in some embodiments, the process 300 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. For example, the apparatus 200 in some embodiments is in communication with separate physical component(s) of one or more industrial plants, and/or the like. For purposes of simplifying the description, the process 300 is described as performed by and from the perspective of the apparatus 200.

The process 300 begins at operation 302. At operation 302, the apparatus 200 includes model maintenance circuitry 212, plan prediction circuitry 214, optional control circuitry 216, communications circuitry 208, input/output circuitry 206, processor 202, and/or the like, or a combination thereof, that defines/generates one or more process models (e.g., an optimization model) and objective function. A given process model (e.g., optimization model), for example, may be associated with one or more industrial plants. In some embodiments, the process model is an optimization model that incorporates uncertainty quantification of uncertain input variables (e.g., effectively accounts for uncertainty in the input data to the model). In some embodiments, the one or more industrial plants may be associated with an enterprise (e.g., a corporation) associated with a plurality industrial plants, wherein each process model (e.g., optimization model) is associated with a given industrial plant of the plurality of industrial plants or wherein a given process model is associated with the plurality of industrial plants. In some embodiments, the one or more process models (e.g., optimization model) is defined/generated based at least in part on non-linear model-predictive control (NMPC) approach. For example, the one or more process models (e.g., optimization model) may be defined/generated based at least in part on one or more features, parameters, techniques, and/or the like embodied by NMPC approach. In some embodiments, defining/generating the one or more process models (e.g., optimization model) may comprise retrieving or receiving the one or more process models from a database.

In some embodiments, defining/determining the objective function comprises specifying one or more objective values and/or relationship between the one or more objective values. The objective function may be defined/determined such that the optimization model generates a minimal amount of error between measured process outputs (based at least in part on predicted plan(s)) and desired/expected output. In the context of generating predicted plan(s) to achieve specified emissions goal(s), the objective function may comprise a profit objective function. In some embodiments, the optimization model may be associated with a plurality of object functions.

At operation 304, the apparatus 200 includes model maintenance circuitry 212, plan prediction circuitry 214, optional control circuitry 216, communications circuitry 208, input/output circuitry 206, processor 202, and/or the like, or a combination thereof, that identifies/determines one or more constraints associated with one or more input variables associated with one or more industrial plants. In some embodiments, the one or more constraints may be identified/determined based at least in part on user input. In some embodiments, the one or more constraints may be retrieved and/or received from a database, a computing device, and/or the like. In some embodiments, the apparatus 200 may identify/determine the one or more constraints (e.g., automatically) based at least in part on the desired target goal. For example, in the context of generating predicted plan(s) to achieve specified emission reduction goal(s), the one or more constraints may include process constraints (e.g., processing machine constraints), emissions constraints, project constraints, safety constraint, financial constraints, quality constraints, and/or the like.

At operation 306, the apparatus 200 includes model maintenance circuitry 212, plan prediction circuitry 214, optional control circuitry 216, communications circuitry 208, input/output circuitry 206, processor 202, and/or the like, or a combination thereof, that determine (e.g., specifies) a priority level for each constraint. As described above, non-limiting examples of constraint types include hard constraints and soft constraints. Hard constraint may describe a constraint having finite priority and that may not be violated, while soft constraint may describe a constraint that can be relaxed (e.g., based at least in part on a priority level associated with the soft constraint) but still optimized for. In some embodiments, determining a priority level for each constraint may comprise assigning a priority level to each constraint based at least in part on the constraint type associated with the constraint. For example, in some embodiments, safety constraints may be classified as hard constraints, wherein hard constraints may be associated with a highest priority level. Accordingly, in the noted example, safety constraints may be assigned a highest priority level. As another example, in some embodiments manipulated variables (such as certain decision variables) may be classified as hard constraints, wherein as noted above, hard constraints may be associated with a highest priority level. Accordingly, in the noted example, manipulated constraints may be assigned a highest priority level. As yet another example, in some embodiments, financial constraints may be classified as soft constraints, wherein soft constraints may be associated with a priority level that is lower relative to hard constraints. Accordingly, in the noted example, financial constraints may be assigned a lower priority level relative to a hard constraint such as a safety constraint and a manipulated constraint. In some embodiments, the constraint type for a given input variable may be determined based at least in part on user input. For example, in some embodiments, a user provides information defining a particular constraint, and indicates whether the constraint is a hard constraint or a soft constraint. Additionally or alternatively, in some embodiments, the priority level for a particular constraint may be determined based at least in part on user input. For example, in some embodiments, a user provides information defining a particular constraint, and indicates the priority level for the particular constraint.

At operation 308, the apparatus 200 includes model maintenance circuitry 212, plan prediction circuitry 214, optional control circuitry 216, communications circuitry 208, input/output circuitry 206, processor 202, and/or the like, or a combination thereof, that determine (e.g., specifies) manipulated variables and controlled variables for the planning optimization problem based at least in part on a plurality of input variables associated with the one or more industrial plants. In some embodiments, the planning optimization problem may comprise a plurality of sub-problems. For example, in some embodiments, determining the manipulated variables and controlled variables for the planning optimization problem may comprise determining manipulated variables and controlled variables for each sub-problem of one or more sub-problems associated with the planning optimization problem (e.g., calibration problem, control problem, optimization problem, uncertainty problem, and/or the like as described above). In some embodiments, manipulated variables and controlled variables for the planning optimization problem may be determined based at least in part on user input. The manipulated variables and controlled variables, for example, may be received via a computing device associated with a user. For example, in some embodiments, a user provides information defining a particular input variable, and indicates whether the input variable is a manipulated variable or a controlled variable. In some embodiments, the manipulated variable and controlled variables may be determined based at least in part on the target goal(s) associated with the optimization model At operation 310, the apparatus 200 includes model maintenance circuitry 212, plan prediction circuitry 214, optional control circuitry 216, communications circuitry 208, input/output circuitry 206, processor 202, and/or the like, or a combination thereof, that determines (e.g., specifies) a set of uncertain input variables for the planning optimization problem. One or more variables that impacts the desired target goal(s) may be uncertain in that they may be associated with data values that are not fixed and may change (e.g., with a market, regulatory environment, political influence, and/or the like over time). In one or more embodiments, the optimization model incorporates a quantification of the noted one or more uncertain input variables (e.g., the one or more variables that impacts the desired target goal(s) whose data values are not fixed and may change over time). In some embodiments, the set of uncertain input variables for the planning optimization problem may be determined based at least in part on user input. A particular uncertain input variable in the set of uncertain input variables, for example, may be received via a computing device associated with a user (e.g., a corporation associated with the industry plant). For example, in some embodiments, a user provides information defining a particular input variable, and indicates whether the input variable is an uncertain input variable. For example, the user may provide, via associated computing device, information defining price of nitrogen as an input variable and indicates that the price of nitrogen is not fixed (e.g., indicates that the price of gas is an uncertain input variable). As another example, the user may provide, via associated computing device, information defining an emissions benefits for a particular project as an input variable and indicates that the emissions benefits for this particular project is not fixed or is unknown (e.g., indicates that emissions benefits for this particular project is an uncertain input variable). In some embodiments, the set of uncertain input variables may be determined (e.g., automatically) based at least in part on the target goal(s), such as emissions reduction goal. For example, in the noted emissions reduction goal, the apparatus 200 may determine that the price of natural gas is an uncertain input variable.

At operation 312, the apparatus 200 includes model maintenance circuitry 212, plan prediction circuitry 214, optional control circuitry 216, communications circuitry 208, input/output circuitry 206, processor 202, and/or the like, or a combination thereof, that determine for each uncertain input variable one or more data ranges for the uncertain input variable. For example, a particular data range may describe an uncertainty range for a particular uncertain input variable. In some embodiments, to determine the data range (e.g., uncertainty range) for an uncertain input variable, the apparatus 200 may generate a data distribution corresponding to the uncertain input variable (e.g., based at least in part on historical data and/or current data associated with the uncertain input variable), and determine the data range based at least in part on the ends of the distribution. For example, in the context of generating predicted plan(s) to achieve specified emissions reduction goal(s), a particular data range corresponding to the price of nitrogen may comprise a range for the price of nitrogen. In the noted example, the range for the price of nitrogen may be determined, for example, based at least in part on historical prices and/or current price of nitrogen. In some embodiments, the historical data may be received or retrieved from one or more databases or external data sources. In some embodiments, the historical data may be received via a computing device associated with a user. In some embodiments, the current data may be received or retrieved from one or more databases or external data sources. In some embodiments, the current data may be received via a computing device associated with a user.

At operation 314, the apparatus 200 includes model maintenance circuitry 212, plan prediction circuitry 214, optional control circuitry 216, communications circuitry 208, input/output circuitry 206, processor 202, and/or the like, or a combination thereof, that determines (e.g., specified) a sampling technique/method and number of samples for sampling the uncertain input variables. Examples of such sampling technique/methods may include simple random sampling, cluster sampling, systemic sampling, stratified sampling, convenience sampling, and/or other sampling techniques/methods. In some embodiments, the sampling technique/method and/or the number of samples may be determined based at least on user input. For example, in some embodiments, the sampling technique/method and/or the number of samples may be received or retrieved via a computing device associated with a user. In some embodiments, the sampling technique/method and/or the number of samples may be determined (e.g., automatically) based at least in part on one or more criteria (e.g., based at least in part on the target goal(s))

FIG. 4 illustrates a flowchart including example operations of an example process for generating an optimized plan comprising optimized plan data in accordance with at least one example embodiment of the present disclosure. The predicted optimized plan can include or be embodied by a schedule. For example. the predicted optimized plan can include prediction(s) and/or schedule(s) of optimization actions to be performed. In some embodiments, the noted example process may be performed subsequent to performing one or more configuration operations (e.g., as described above in relation to FIG. 3). Specifically, FIG. 4 illustrates an example computer-implemented process 400. In some embodiments, the process 400 is embodied by computer program code stored on a non-transitory computer-readable storage medium of a computer program product configured for execution to perform the process as depicted and described. Alternatively or additionally, in some embodiments, the process 400 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate physical component(s) of one or more industrial plants, and/or the like. For purposes of simplifying the description, the process 400 is described as performed by and from the perspective of the apparatus 200.

The process 400 begins at operation 402. At operation 402, the apparatus 200 includes model maintenance circuitry 212, plan prediction circuitry 214, optional control circuitry 216, communications circuitry 208, input/output circuitry 206, processor 202, and/or the like, or a combination thereof, that receives or retrieves input data associated with one or more industrial plants. The input data may comprise current input data for the model execution cycle and may comprise data corresponding to a plurality of input variables. The input data, for example, may include one or more of emissions data for one or more processes associated with the one or more industrial plants, building data (e.g., plant layout, plant size, and/or the like), asset-related data (e.g., assets that relate manipulated variables to product rates), emissions rate, utilities consumption, lower and upper limits on various constraints (e.g., safety constraints, quality constraints, and/or other constraints), cost data, average operating data, and/or plan achievement probability measure. A plan achievement probability measure may describe the desired likelihood of achieving the desired target goal(s) based at least in part on output (e.g., predicted optimized plan(s)) of the optimization model). In some embodiments, the input data may be received from one or more databases. Additionally or alternatively, the input data may be received from one or more sensing devices (e.g., sensors) associated with one or more physical components (e.g., processing machines, and/or the like). Additionally or alternatively, in some embodiments, portions of input data may be identified based at least in part on one or more other portion(s) of data. In one or more embodiments, portions of the input data include uncertain data (e.g., data associated with input variable that is not fixed or whose value is unknown). As described above, examples of uncertain input variable may include price of a particular raw material(s) (e.g. natural gas), emissions benefits of a particular project, and/or the like.

At operation 404, the apparatus 200 includes model maintenance circuitry 212, plan prediction circuitry 214, optional control circuitry 216, communications circuitry 208, input/output circuitry 206, processor 202, and/or the like, or a combination thereof, that generates uncertainty-based modification data. The uncertainty-based modification data, for example, may be generated for the uncertain data in the input data, and may correspond to the set of uncertain input variables (e.g., the set of uncertain input variables generated at operation 310). In some embodiments, the apparatus 200 may generate uncertainty-based modification data for each uncertain input variable in the set of uncertain input variables based at least in part on the data distribution(s) for the uncertain input variables (e.g., the data distributions(s) determined at operation 312) and using the determined sampling technique/method and number of sample(s) (e.g., determined at operation 314). For example, in some embodiments, generating the uncertainty-based modification data may comprise sampling the data distribution(s) (e.g., determined at operation 312) for each uncertain input variable in the set of uncertain input variables using the sampling technique/method and number of samples (e.g., determined at operation 314).

At operation 406, the apparatus 200 includes model maintenance circuitry 212, plan prediction circuitry 214, optional control circuitry 216, communications circuitry 208, input/output circuitry 206, processor 202, and/or the like, or a combination thereof, that applies the uncertainty-based modification data to the input data to generate updated input data. In some embodiments, applying the uncertainty-based modification data to the input data comprises altering the input data based at least in part on the uncertainty-based modification data or otherwise combining the uncertainty-based modification data with the input data in a manner that accounts for the uncertainty in the input data. For example, in some embodiments applying the uncertainty-based modification data to the input data may comprise changing each uncertain data in the input data to the corresponding uncertainty-based modification data for the uncertain data (e.g., for each uncertain input variable, changing the associated uncertain data to the corresponding uncertainty-based modification data). As another example, in some embodiments applying the uncertainty-based modification data to the input data may comprise, for each uncertain input variable in the set of uncertain input variables appending the input data with the corresponding uncertainty-based modification data. As yet another example, in some embodiments, applying the uncertainty-based modification data to the input data may comprise, for each input variable in the set of input variables: (i) changing the associated uncertain data in the input data to the corresponding uncertainty-based modification data and/or (ii) appending the input data with the corresponding uncertainty-based modification data.

At operation 408, the apparatus 200 includes model maintenance circuitry 212, plan prediction circuitry 214, optional control circuitry 216, communications circuitry 208, input/output circuitry 206, processor 202, and/or the like, or a combination thereof, that generates an optimized plan based at least in part on applying the updated input data to an optimization model. The optimized plan may comprise optimized plan data. In some embodiments, operation 408 may be performed in accordance with the example process 600 that is depicted in FIG. 6.

At operation 410, the apparatus 200 includes model maintenance circuitry 212, plan prediction circuitry 214, optional control circuitry 216, communications circuitry 208, input/output circuitry 206, processor 202, and/or the like, or a combination thereof, that initiates the performance one or more prediction-based actions based at least in part on the generated optimized plan. In some embodiments, initiating the one or more prediction-based actions comprises outputting the predicted optimized plan(s) (e.g., predicted optimized plan data thereof). In some embodiments, the apparatus 200 outputs the predicted optimized plan(s) via a display of the apparatus 200, for example by causing rendering of user interface (e.g., output user interface) via the apparatus 200. Additionally or alternatively, in some embodiments, the apparatus 200 outputs the predicted optimized plan(s) via at least one transmission to a client device to cause the client device to cause rendering of a user interface including or otherwise associated with the predicted optimized plan(s). Additionally or alternatively, in some embodiments, the apparatus 200 outputs the predicted optimized plan(s) for subsequent downstream processing. In some embodiments, the apparatus 200 outputs the predicted optimized plan(s) by transmitting the predicted optimized plan(s) for use and/or further processing by an external device, system, and/or the like. In some embodiments, the apparatus 200 outputs the predicted optimized plan(s) for use in automatically configuring/reconfiguring operation one or more physical component(s) of one or more industrial plants, such as a processing machine, based at least in part on the generated predicted optimized plan data. For example, in some embodiments, the apparatus 200 outputs the predicted optimized plan(s) to facilitate operation of at least one physical component of an industrial plant(s) based at least in part on the predicted optimized plan (e.g., the optimized plan data thereof), for example by setting a configuration of at least one physical component in the industrial plant(s) in accordance with the predicted optimized plan.

In some embodiments, at least a portion of the predicted optimized plan is outputted for use with at least one plant-wide optimization process. For example, in some embodiments the apparatus 200 outputs the at least a portion of the predicted optimized plan by applying the at least a portion of the predicted optimized plan to a plant-wide optimization process. In some embodiments, the plant-wide optimization process generates optimized carbon emission levels in accordance with the predicted optimized plan that enables achievement of net zero emission over a specified time horizon. For example, the optimization may be utilized to optimize target amounts of final products, operation of process machines, utility usage, and/or the like in a manner that maximizes and/or minimizes one or more target parameter(s), for example an emissions amount associated with operation of one or more industrial plants, a profit parameter associated with operation of one or more industrial plants, and/or the like.

In some embodiments, one or more operations of the process 400 may be performed periodically (e.g., every month, every 2 months, and/or the like). Additionally and/or alternating one or more operations of the process 400 may be performed in response to one or more changes/updates, (e.g., changes in input data such as new and/or updated cost data, new and/or updated constraints data, and/or the like). In some embodiments, each execution of the noted one or more operations of the process 400 may comprise a model execution cycle, wherein the output of an executed cycle is a predicted optimized plan that is generated based at least in part on current input data.

FIG. 5 provides an operation example showing an output user interface 500 that may be generated based at least in part on user interface data which are in turn generated based at least in part on the predicted optimized plan(s). The output user interface 500 may display various data associated with the optimization model and/or the predicted optimized plan(s). As depicted in FIG. 5, the output user interface may display data corresponding to portions of the predicted optimized plan(s), data derived from the predicted optimized plan(s), data corresponding to implementation results of the predicted optimized plan(s), and/or the like. Examples of such user interface data may include performance data 502, production cost 504, project data, and/or the like FIG. 6 illustrates a flowchart including example operations of an example process for generating predicted optimized plan(s) based at least in part on applying the updated input data to an optimization model. FIG. 6 illustrates an example computer-implemented process 600. In some embodiments, the process 600 is embodied by computer program code stored on a non-transitory computer-readable storage medium of a computer program product configured for execution to perform the process as depicted and described. Alternatively or additionally, in some embodiments, the process 600 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. For example, the apparatus 200 in some embodiments is in communication with separate physical component(s) of one or more industrial plants, and/or the like. For purposes of simplifying the description, the process 600 is described as performed by and from the perspective of the apparatus 200.

The process 600 begins at operation 602. At operation 602, the apparatus 200 includes model maintenance circuitry 212, plan prediction circuitry 214, optional control circuitry 216, communications circuitry 208, input/output circuitry 206, processor 202, and/or the like, or a combination thereof, that optimizes, based at least in part on historical data, a calibration problem. Optimizing the calibration problem may embody a feedback mechanism that enables updates to be made to the optimization model based at least in part on historical data associated with the optimization model (e.g., historical predicted plans and/or historical input data). The noted feedback mechanism enables a closed loop performance which ensures with reasonable certainty that the model predictions converge to actual measurements from the processes of the corresponding industrial plant(s). For example, optimizing the calibration problem may comprise (i) computing and learning biases between historical predicted plans and corresponding actual measurements (e.g., emissions measurements) and (ii) incorporating the noted biases into the optimization model, which in turn minimizes prediction error and improves the prediction accuracy of the optimization model. In some embodiments, to optimize the calibration problem, the apparatus 200 performs the operations of equation 5 (described above). In some embodiments, the feedback mechanism comprise a machine learning-based feedback mechanism. For example, in some embodiments, the feedback mechanism comprise one or more machine learning models (e.g., regression-based machine learning, and/or the like.).

At operation 604, the apparatus 200 includes model maintenance circuitry 212, plan prediction circuitry 214, optional control circuitry 216, communications circuitry 208, input/output circuitry 206, processor 202, and/or the like, or a combination thereof, that for each sampled set of uncertain input variable, optimizes based at least in part on a priority order, a control error minimization problem for each of one or more constraint priority groups, wherein each constraint priority group may be associated with a priority level. In some embodiments, to optimize the control error minimization problem, the apparatus 200 performs the operations of equation 6 (described above).

At operation 606, the apparatus 200 includes model maintenance circuitry 212, plan prediction circuitry 214, optional control circuitry 216, communications circuitry 208, input/output circuitry 206, processor 202, and/or the like, or a combination thereof, that for each sampled set of uncertain input variable, optimizes a maximization problem that incorporates uncertainty quantification. In some embodiments, the maximization problem is a profit maximization problem. In some embodiments, the profit maximization problem comprises at least a decision variable cost measure. The decision variable cost measure may comprise cost for decision variable changes from the current plan.

At operation 608, the apparatus 200 includes a model maintenance circuitry 212, plan prediction circuitry 214, optional control circuitry 216, communications circuitry 208, input/output circuitry 206, processor 202, and/or the like, or a combination thereof, that for each sample set of uncertain input variable, generates the predicted optimized plan based at least in part on the output of the calibration problem, the control error minimization problem and/or the profit maximization problem.

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for generating an optimized plan with respect to a target comprising:
   receiving, using one or more processors, input data associated with one or more industrial plants, wherein at least a portion of the input data comprises uncertain input data;
   identifying, using the one or more processors, a set of uncertain input variables associated with the uncertain input data;
   generating, using the one or more processors, a data distribution for each uncertain input variable in the set of uncertain input variables;
   generating, using the one or more processors, uncertainty-based modification data based at least in part on sampling the data distribution for each uncertain input variable;
   applying at least the uncertainty-based modification data to the input data to generate updated input data;
   generating, using the one or more processors and based at least in part on applying the updated input data to an optimization model, predicted optimized plan comprising optimized plan data, wherein the generation of the predicted optimized plan based at least in part on applying the updated input data comprises for each sampled set of uncertain input variables, optimizing a control error minimization problem for each of one or more constraint priority groups associated with operation of the one or more industrial plants based at least in part on a priority order, wherein each constraint priority group is associated with a priority level; and initiating, using the one or more processors, performance of one or more prediction-based actions based at least in part on the predicted optimized plan.

2. The computer-implemented method of claim 1, wherein generating the predicted optimized plan based at least in part on applying the input data comprises:

for each sampled set of uncertain input variables:

optimizing, using the one or more processors, a profit maximization problem, wherein the profit maximization problem comprises at least a decision variable cost measure.

3. The computer-implemented method of claim 1, wherein the optimization model embodies a non-linear model predictive control.

4. The computer-implemented method of claim 1, wherein the optimization model comprises at least a feedback mechanism configured to enable closed loop planning.

5. The computer-implemented method of claim 1, wherein initiating performance of one or more prediction-based actions comprises outputting at least a portion of the optimized plan to a user interface.

6. The computer-implemented method of claim 1, wherein initiating performance of one or more prediction-based action comprise causing automatic reconfiguration of operation of at least one physical component of the one or more industrial plants based at least in part on at least a portion of the optimized plan.

7. An apparatus for generating an optimized plan with respect to a target, the apparatus comprising at least one processor and at least one non-transitory memory including computer-coded instructions thereon, the computer-coded instructions, with the at least one processor, cause the apparatus to:

receive input data associated with one or more industrial plants, wherein at least a portion of the input data comprises uncertain input data;

identify a set of uncertain input variables associated with the uncertain input data;

generate a data distribution for each uncertain input variable in the set of uncertain input variables;

generate uncertainty-based modification data based at least in part on sampling the data distribution for each uncertain input variable;

apply at least the uncertainty-based modification data to the input data to generate updated input data;

generate, based at least in part on applying the updated input data to an optimization model, predicted optimized plan comprising optimized plan data, wherein the generation of the predicted optimized plan based at least in part on applying the updated input data comprises for each sampled set of uncertain input variables, optimizing a control error minimization problem for each of one or more constraint priority groups associated with operation of the one or more industrial plants based at least in part on a priority order, wherein each constraint priority group is associated with a priority level; and initiate performance of one or more prediction-based actions based at least in part on the predicted optimized plan.

8. The apparatus of claim 7, wherein the computer-coded instructions, with the at least one processor, cause the apparatus to generate the predicted optimized plan based at least in part on applying the input data comprises:

for each sampled set of uncertain input variables:

optimizing a profit maximization problem, wherein the profit maximization problem comprises at least a decision variable cost measure.

9. The apparatus of claim 7, wherein the optimization model embodies a non-linear model predictive control.

10. The apparatus of claim 7, wherein the optimization model comprises at least a feedback mechanism configured to enable closed loop planning.

11. The apparatus of claim 7, wherein the computer-coded instructions, with the at least one processor, cause the apparatus to initiate performance of one or more prediction-based actions comprises outputting at least a portion of the optimized plan to a user interface.

12. The apparatus of claim 7, wherein the computer-coded instructions, with the at least one processor, cause the apparatus to initiate performance of one or more prediction-based action comprise causing automatic reconfiguration of operation of at least one physical component of the one or more industrial plants based at least in part on at least a portion of the optimized plan.

13. A computer program product generating an optimized plan with respect to a target, the computer program product comprising at least one non-transitory computer-readable storage medium having computer program code stored thereon that, in execution with at least one processor, configures the computer program product for:

receiving input data associated with one or more industrial plants, wherein at least a portion of the input data comprises uncertain input data;

identifying, using the one or more processors, a set of uncertain input variables associated with the uncertain input data;

generating, using the one or more processors, a data distribution for each uncertain input variable in the set of uncertain input variables;

generating uncertainty-based modification data based at least in part on sampling the data distribution for each uncertain input variable;

applying at least the uncertainty-based modification data to the input data to generate updated input data;

generating, based at least in part on applying the updated input data to an optimization model, predicted optimized plan comprising optimized plan data, wherein the generation of the predicted optimized plan based at least in part on applying the updated input data comprises for each sampled set of uncertain input variables, optimizing a control error minimization problem for each of one or more constraint priority groups associated with operation of the one or more industrial plants based at least in part on a priority order, wherein each constraint priority group is associated with a priority level; and initiating the performance of one or more prediction-based actions based at least in part on the predicted optimized plan.

14. The computer program product of claim 13, wherein generating the predicted optimized plan based at least in part on applying the input data comprises:

for each sampled set of uncertain input variables:

optimizing a profit maximization problem, wherein the profit maximization problem comprises at least a decision variable cost measure.

15. The computer program product of claim 13, wherein the optimization model embodies a non-linear model predictive control.

16. The computer program product of claim 13, wherein the optimization model comprises at least a feedback mechanism configured to enable closed loop planning.

17. The computer program product of claim 13, wherein initiating performance of one or more prediction-based actions comprises outputting at least a portion of the optimized plan to a user interface.

\* \* \* \* \*